(12) United States Patent
Finke et al.

(10) Patent No.: US 11,713,720 B2
(45) Date of Patent: Aug. 1, 2023

(54) TURBOMACHINE DUAL SPOOL TRANSMISSION SYSTEMS

(71) Applicant: Hamilton Sundstrand Corporation, Charlotte, NC (US)

(72) Inventors: Aaron M. Finke, Janesville, WI (US); Stephen Michael Bortoli, Roscoe, IL (US); Jonathan C. Dell, Elgin, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 16 days.

(21) Appl. No.: 17/473,530

(22) Filed: Sep. 13, 2021

(65) Prior Publication Data

US 2021/0404389 A1 Dec. 30, 2021

Related U.S. Application Data

(63) Continuation-in-part of application No. 16/536,960, filed on Aug. 9, 2019, now Pat. No. 11,118,514.

(51) Int. Cl.
*F16H 3/64* (2006.01)
*F02C 7/32* (2006.01)

(52) U.S. Cl.
CPC ........ *F02C 7/32* (2013.01); *F05D 2260/4023* (2013.01); *F05D 2260/40311* (2013.01)

(58) Field of Classification Search
CPC ... F05D 2260/4023; F05D 2260/40311; F16H 2200/2035; F16H 2200/2007; F16H 2200/2005; F16H 3/64
See application file for complete search history.

(56) References Cited

U.S. PATENT DOCUMENTS

| 4,738,163 | A | 4/1988 | Anderson et al. |
| 6,832,970 | B2 | 12/2004 | Eibler |
| 7,788,898 | B2 | 9/2010 | Kern et al. |
| 7,841,845 | B2 | 11/2010 | Ignatiev |

(Continued)

FOREIGN PATENT DOCUMENTS

| WO | 08044972 A1 | 4/2008 |
| WO | 2008082336 A1 | 7/2008 |
| WO | 2015073084 A1 | 5/2015 |

OTHER PUBLICATIONS

Extended European Search Report dated Jun. 29, 2020, issued during the prosecution of European Patent Application No. EP 19215795.6.

(Continued)

*Primary Examiner* — Stacey A Fluhart
(74) *Attorney, Agent, or Firm* — Locke Lord LLP; Daniel J. Fiorello; Gabrielle L. Gelozin

(57) ABSTRACT

A turbomachine dual spool transmission system can include a transmission assembly configured to connect to a combination output of a dual spool differential at a transmission input to be driven by the combination output to turn a transmission output. The transmission assembly can be configured to provide a first output gear ratio in a first state and a second output gear ratio in a second state. The system can include the dual spool differential. The dual spool differential can include a gear assembly configured to combine a low pressure spool input and a high pressure spool input into a combination output to provide an output speed range smaller than a low pressure speed range alone.

18 Claims, 4 Drawing Sheets

(56) References Cited

U.S. PATENT DOCUMENTS

| | | | |
|---|---|---|---|
| 7,973,422 B2 | 7/2011 | Colin et al. | |
| 9,233,606 B2 | 1/2016 | Takahashi et al. | |
| 9,726,186 B2 | 8/2017 | Masson et al. | |
| 10,591,025 B2 | 3/2020 | Fliearman et al. | |
| 2003/0015433 A1 | 1/2003 | Tsuchida et al. | |
| 2005/0015381 A1 | 1/2005 | Clifford et al. | |
| 2007/0015125 A1 | 1/2007 | Mobbs et al. | |
| 2012/0020165 A1 | 1/2012 | Takekida | |
| 2013/0024753 A1 | 1/2013 | Masuda et al. | |
| 2017/0010971 A1 | 1/2017 | Mizrahi et al. | |
| 2017/0024808 A1 | 1/2017 | Plattsmier et al. | |
| 2018/0014909 A1 | 1/2018 | Larsen et al. | |
| 2019/0003945 A1 | 1/2019 | Rust et al. | |
| 2019/0038322 A1 | 2/2019 | Suh et al. | |
| 2020/0008049 A1 | 1/2020 | Namiranian | |
| 2020/0015821 A1 | 1/2020 | Baxter, III et al. | |
| 2020/0248632 A1* | 8/2020 | Leque | F02C 7/275 |
| 2020/0386188 A1* | 12/2020 | Kupratis | F02C 7/36 |
| 2021/0146767 A1* | 5/2021 | Gassmann | B60K 6/48 |

OTHER PUBLICATIONS

Extended European Search Report dated Jul. 15, 2020, issued during the prosecution of European Patent Application No. EP 19213496.3.
Jong-Jin Won et al., "Deterministic Multi-Dimensional Task Scheduling Algorithms for Wearable Sensor Devices", KSII Transactions on Internet and Information Systems, vol. 9, No. 10, Oct. 31, 2014, pp. 3423-3438.

* cited by examiner

FIG. 5

TURBOMACHINE DUAL SPOOL TRANSMISSION SYSTEMS

CROSS-REFERENCE TO RELATED APPLICATIONS

This application is a continuation-in-part of U.S. patent application Ser. No. 16/536,960, filed Aug. 9, 2019, the entire content of which is incorporated by reference herein.

FIELD

This disclosure relates to turbomachine transmissions, more specifically to dual spool transmission systems.

BACKGROUND

A desire by aircraft engine manufacturers to extract accessory power from the low pressure spool (LS) instead of the high pressure spool (HS) is hindered by the difference in optimum speed ratios between the accessories and LS and HS. Certain accessory speed ranges are approximately 2.2:1 (e.g., for a variable frequency generator that has a speed range of 360 Hz 800 Hz) while the LS speed range can be up to 10:1. Constant and/or variable frequency generators speed ranges are a result of speed conditioning capability and the output frequency range required by the aircraft. Further, the wide speed range of the LS has some drawbacks for power extraction, e.g., very high torque at low speed, and the need to condition the output speed for the accessories.

Certain proposed solutions may include large and complex multi-speed or variable-speed transmissions to condition the LS output speed. The size of such transmissions is driven by high torque at LS minimum speed. High torque at minimum speed is a result of constant power extraction requirements for accessories.

Such conventional methods and systems have generally been considered satisfactory for their intended purpose. However, there is still a need in the art for improved transmission systems. The present disclosure provides a solution for this need.

SUMMARY

A turbomachine dual spool transmission system can include a transmission assembly configured to connect to a combination output of a dual spool differential at a transmission input to be driven by the combination output to turn a transmission output. The transmission assembly can be configured to provide a first output gear ratio in a first state and a second output gear ratio in a second state. The system can include the dual spool differential. The dual spool differential can include a gear assembly configured to combine a low pressure spool input and a high pressure spool input into a combination output to provide an output speed range smaller than a low-spool speed range.

The transmission assembly can include a transmission ring gear, a transmission sun gear, and a plurality of transmission planetary gears disposed between the transmission sun gear and the transmission ring gear and meshed with the transmission sun gear and the transmission ring gear. The transmission planetary gears can be rotationally connected to a transmission carrier.

The transmission input can be the transmission carrier or can be connected to the transmission carrier, for example. The transmission output can be the transmission ring gear or can be connected to the transmission ring gear.

The transmission sun gear can be configured to be grounded such that the transmission sun gear does not rotate. In embodiments, the transmission sun gear can be configured to be grounded via a grounding clutch. The system can also include a rotating clutch configured to selectively engage the transmission carrier and the transmission ring gear. For example, in the first state, the rotating clutch can be disengaged and the sun gear can be grounded such that the transmission carrier can rotate relative to the transmission ring gear and such that the transmission ring gear is rotated by the planetary gears in accordance with the first gear ratio. In embodiments, the sun gear can be grounded by engaging the grounding clutch. In the second state, the rotating clutch can be engaged and the sun gear can be configured to be not grounded such that the transmission carrier is fixed to the transmission ring gear and directly rotates the transmission ring gear in accordance with the second gear ratio. In embodiments, the sun gear can be not grounded by disengaging the grounding clutch.

The transmission carrier includes a transmission input gear meshed with an output gear of the combination output.

In accordance with at least one aspect of this disclosure, a turbomachine can include a high pressure spool and a low pressure spool (e.g., any suitable a dual spool turbomachine as appreciated by those having ordinary skill in the art). The turbomachine can include a turbomachine dual spool differential as disclosed herein connected to the low pressure spool at a low pressure spool input and the high pressure spool at a high pressure spool input. The turbomachine can include a transmission assembly as disclosed herein (e.g., as described above) connected to the dual spool differential.

In accordance with at least one aspect of this disclosure, a method can include combining a low pressure spool input of a turbomachine and a high pressure spool turbomachine into a combination output to produce a reduced speed range relative to a low pressure spool speed range. The method can include maintaining an accessory speed range using a transmission connected to the combination output by selectively switching between a first state having a first gear ratio and a second state having a second gear ratio. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 5 is a chart of low pressure spool power extraction as a function of both low pressure spool input speed (N1 speed) and high pressure spool input speed (N2 speed)

DETAILED DESCRIPTION

Figure 2:
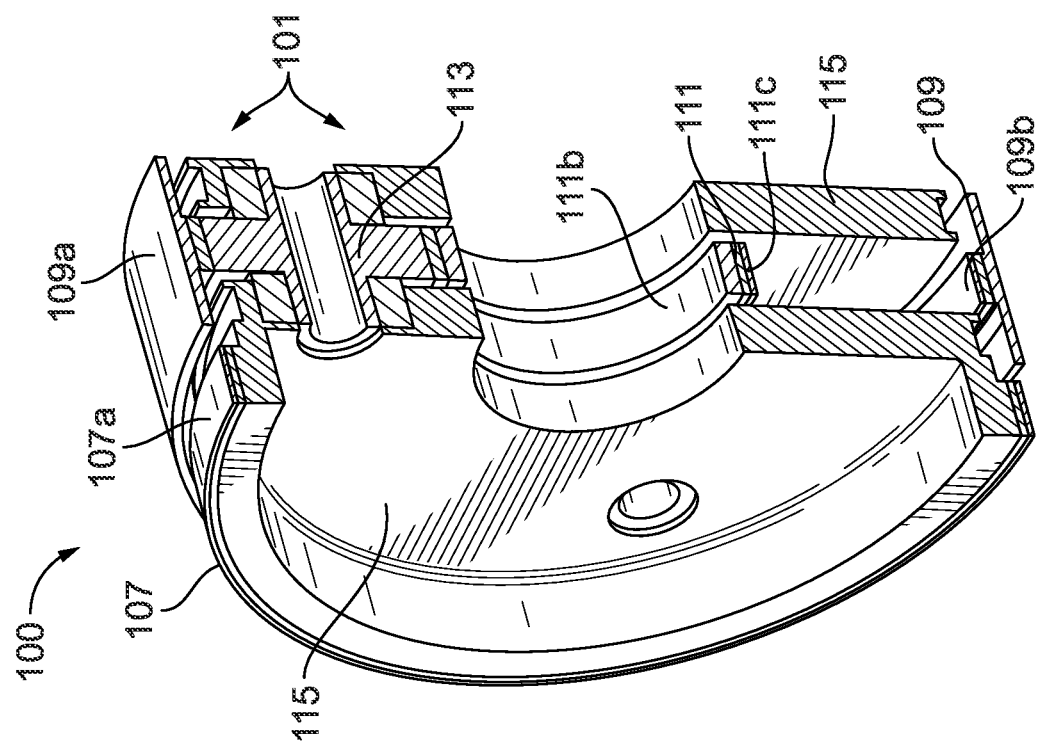
FIG. 2 is a perspective cross-sectional view of the embodiment of FIG. 1.
Figure 1:
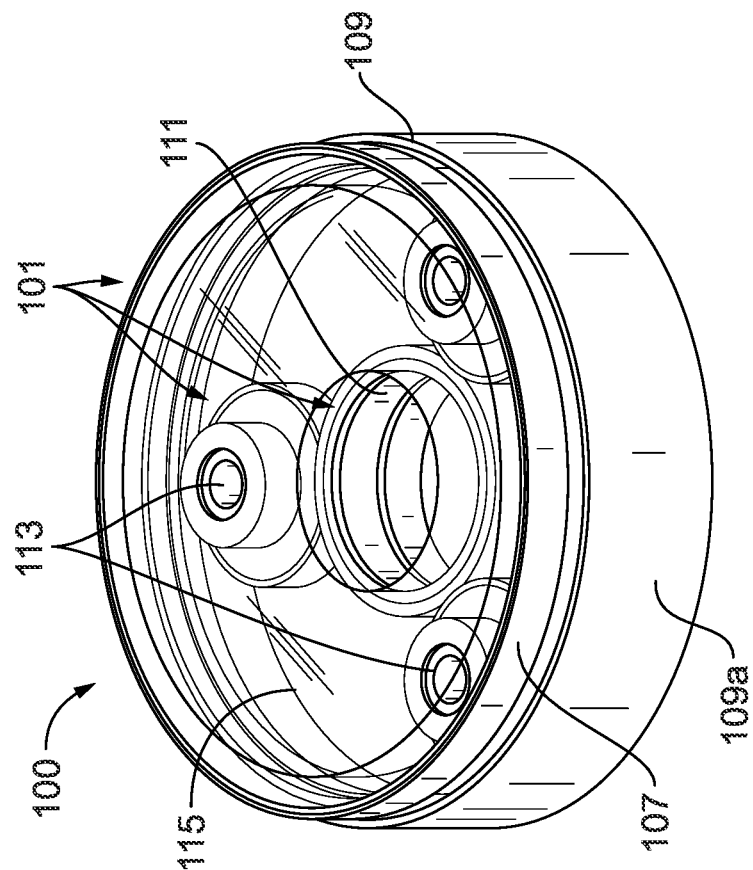
FIG. 1 is a perspective view of an embodiment of a differential in accordance with this disclosure.

Reference will now be made to the drawings wherein like reference numerals identify similar structural features or aspects of the subject disclosure. For purposes of explanation and illustration, and not limitation, an illustrative view of an embodiment of a differential in accordance with the disclosure is shown in FIG. 1 and is designated generally by reference character 100. Other embodiments and/or aspects of this disclosure are shown in FIGS. 2-6.

Referring to FIGS. 1-4, a turbomachine dual spool differential 100 can include a gear assembly 101 configured to combine a low pressure spool input (e.g., input shaft 403) and a high pressure spool input (e.g., input shaft 405) into a combination output 107 to provide an output speed range (e.g., about 4:1 maximum) smaller than a low pressure spool speed range alone (e.g., about 10:1 maximum). In certain embodiments, the gear assembly 101 can include a ring gear 109, a sun gear 111, and a plurality of planetary gears 113 disposed between the sun gear 111 and the ring gear 109 and meshed with the sun gear 111 and the ring gear 109.

The planetary gears 113 can be rotationally connected to a carrier 115. The carrier 115 can include two sides, for example, e.g., as shown, that can be connected in any suitable manner (e.g., both sides bolted together) to trap the planetary gears 113.

In certain embodiments, the ring gear 109 can be configured to connect to the low pressure spool input 403 to rotate the ring gear 109 with the low pressure spool input 403, e.g., as shown. The ring gear 109 can include a spline or gear on an outer diameter 109*a* thereof, for example. Any suitable type of engagement and/or fastener to connect an input to the ring gear 109 is contemplated herein. The ring gear 109 can include gear teeth 109*b* on an inner diameter thereof meshed with gear teeth 113*a* of the planetary gears 113.

In certain embodiments, the sun gear 111 can be configured to be connected to the high pressure spool input 405 to rotate the sun gear 111, e.g., as shown. In certain embodiments, the sun gear 111 can include an inner opening 111*a*, e.g., defined through the sun gear 111. The sun gear 111 can include a spline 111*b* or a gear on an inner diameter thereof, for example. Any suitable type of engagement and/or fastener to connect an input to the sun gear 111 is contemplated herein. The sun gear 111 can include gear teeth 111*c* on an outer diameter thereof meshed with the gear teeth 113*a* of the planetary gears 113.

Figure 4:
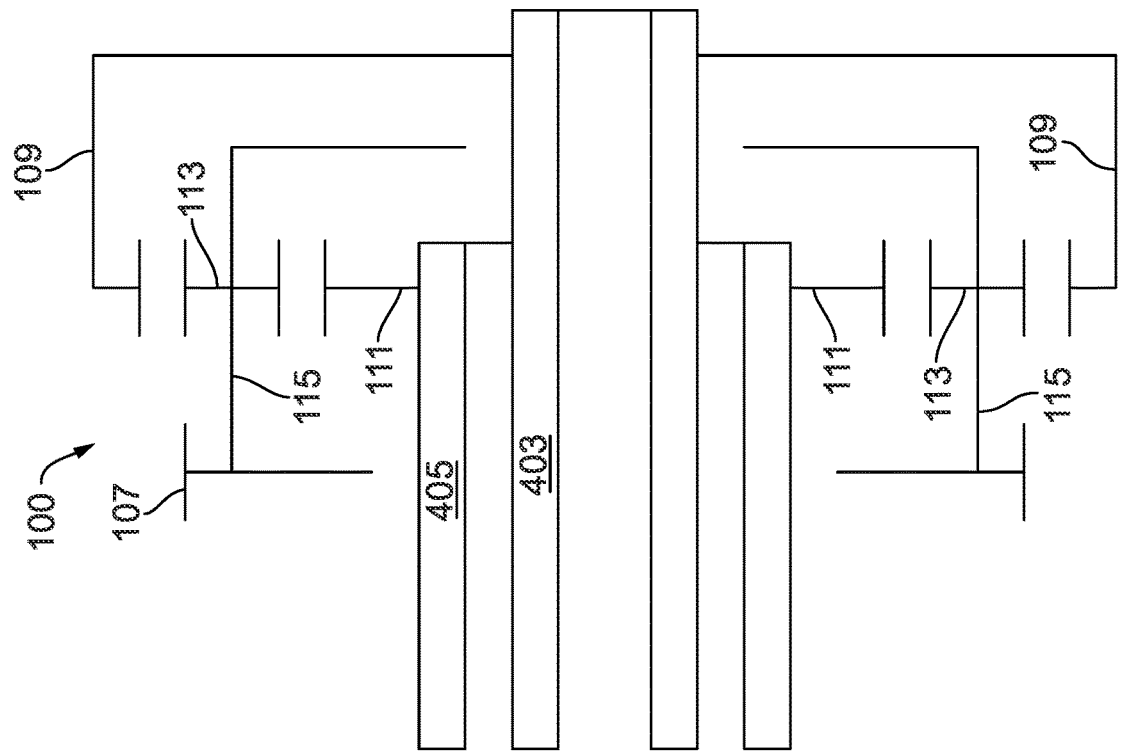
FIG. 4 is a schematic representation of the embodiment of FIG. 1, showing connected to a coaxial spool inputs.
Figure 3:
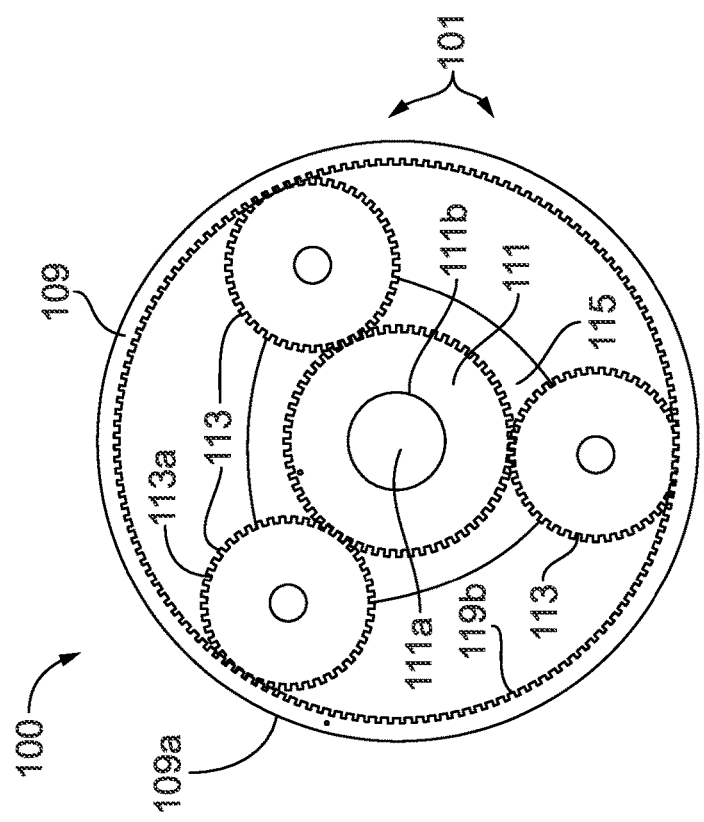
FIG. 3 is a plan view of the gear assembly of the embodiment of FIG. 1.

As shown in FIG. 4, the input shafts (e.g., the high pressure spool and the low pressure spool) can be coaxial and in-line. In other embodiments, the high pressure spool and the low pressure spool can be separately positioned in any suitable manner (e.g., not coaxially). In certain embodiments, the spools can be separated and geared to the transmission, for example, which is connected to the differential 100.

The carrier 115 can be configured to connect to the combination output 107 to rotate the combination output 107 as a function of both of the low pressure spool input 403 and the high pressure spool input 405. In certain embodiments, the combination output 107 can be connected to or a part of the carrier 105. The carrier 105 can include a spline or a gear on an outer diameter 107*a* thereof that is the combination output 107 or is configured to connect to the combination output 107. For example, the carrier 105 can extend axially beyond the ring gear 109 and can include a gear on the outer diameter 107*a*, e.g., as shown.

In certain embodiments, the ring gear to sun gear ratio can be 2.5:1 such that the gear assembly 101 is configured to convert a 7.1:1 low pressure spool speed range and a 2.2:1 high pressure spool speed range to a 3.6:1 output speed range. Any other suitable gear ratio is contemplated herein. Any suitable output speed range is contemplated herein.

Figure 6:
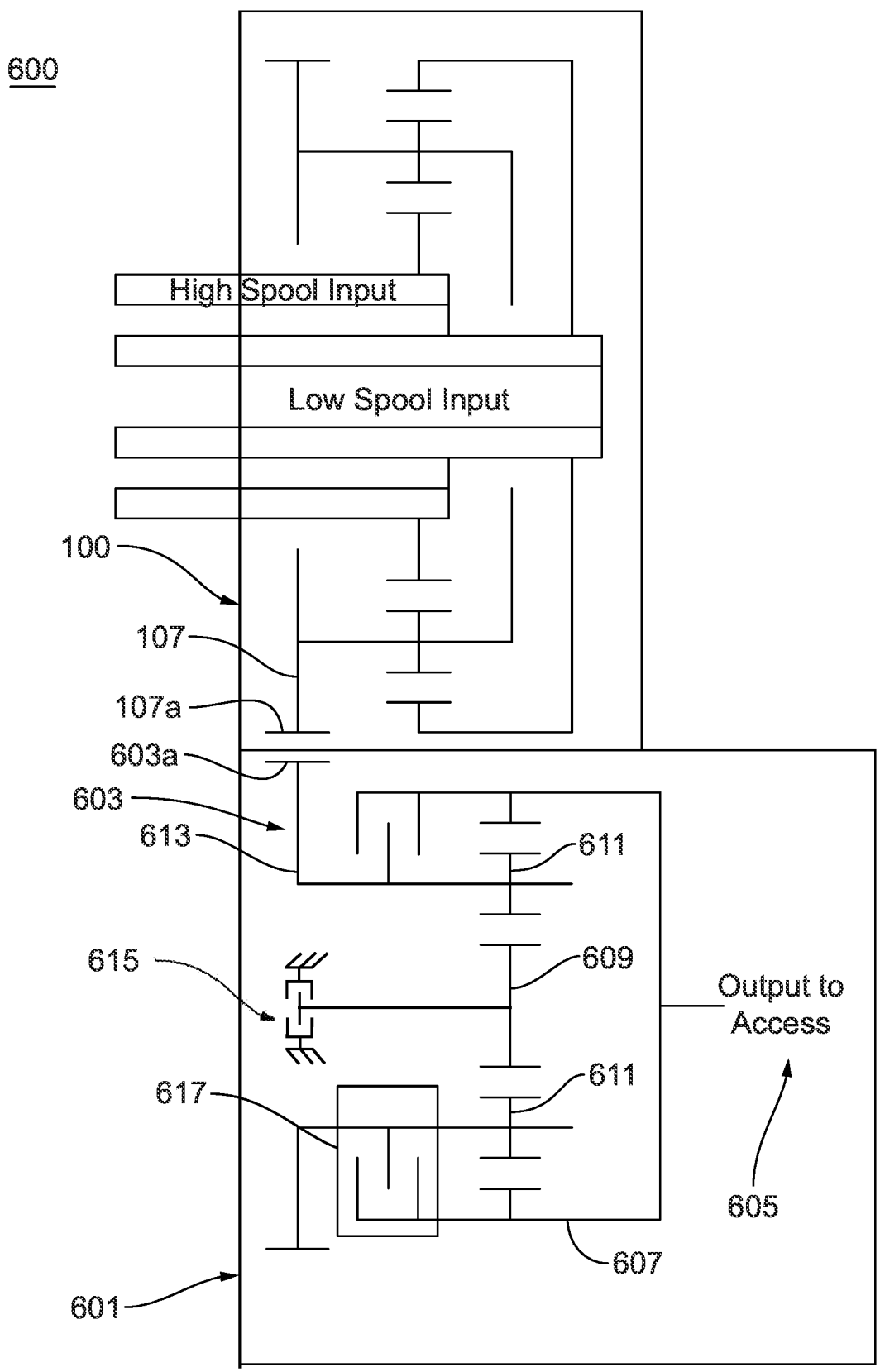
FIG. 6 is a schematic view of an embodiment of a transmission system in accordance with this disclosure.

Referring additionally to FIG. 6, a turbomachine dual spool transmission system 600 can include a transmission assembly 601 configured to connect to the combination output 107 of a dual spool differential 100 at a transmission input 603 to be driven by the combination output 107 to turn a transmission output 605. The transmission assembly 601 can be configured to provide a first output gear ratio in a first state and a second output gear ratio in a second state. As shown, the system 600 can include the dual spool differential 100, e.g., as described above.

The transmission assembly 600 can include a transmission ring gear 607, a transmission sun gear 609, and a plurality of transmission planetary gears 611 disposed between the transmission sun gear 609 and the transmission ring gear 607 and meshed with the transmission sun gear 609 and the transmission ring gear 607. The transmission planetary gears 611 can be rotationally connected to a transmission carrier 613. The gears 607, 609, and 611 can be meshed in any suitable manner as appreciated by those having ordinary skill in the art, e.g., as shown (e.g., similar to the gear assembly 101 of the differential 100).

The transmission input 603 can be the transmission carrier 613 or can be connected to the transmission carrier 613, for example (e.g., gear teeth disposed on an axial extension of the carrier 613 as shown). The transmission output 605 can be the transmission ring gear 607 or can be connected to the transmission ring gear 607. The transmission sun gear 609 can be grounded, e.g., to a ground (e.g. an engine housing) via a grounding clutch 615 such that the transmission sun gear 609 does not rotate.

The system 100 can include a clutch 617 configured to selectively engage the transmission carrier 613 and the transmission ring gear 607 together. For example, in the first state, the clutch 617 can be disengaged and the grounding clutch 615 can be engaged such that the transmission carrier 613 can rotate relative to the transmission ring gear 607 and such that the transmission ring gear 601 is rotated by the planetary gears 611 in accordance with the first gear ratio (the ratio defined by the relationship of gears 607, 609, and 611). For example, where the sun gear 609 is fixed, e.g., as shown, the carrier 613 will drive the planetary gears to rotate around the sun gear 609.

In the second state, the clutch 617 can be engaged and the grounding clutch 615 can be disengaged such that the transmission carrier 613 is fixed to the transmission ring gear 607 and directly rotates the transmission ring gear 607 in accordance with the second gear ratio. For example, the transmission carrier 613 can include a transmission input gear 603*a* meshed with an output gear 107*a* of the combination output 107, the ratio of which can define the second gear ratio.

In accordance with at least one aspect of this disclosure, a turbomachine (not shown) can include a high pressure spool (e.g., spool input 405) and a low pressure spool (e.g., spool input 403). Any suitable multi-spool turbomachine is contemplated herein as appreciated by those having ordinary skill in the art. The turbomachine can include a turbomachine dual spool differential having a gear assembly as disclosed herein (e.g., 101 as described above) connected to the low pressure spool at a low pressure spool input and the high pressure spool at a high pressure spool input. The turbomachine can include a transmission assembly (e.g., 601) as disclosed herein (e.g., as described above) connected to the dual spool differential.

In accordance with at least one aspect of this disclosure, a method can include combining a low pressure spool input of a turbomachine and a high pressure spool turbomachine into a combination output to produce a reduced speed range relative to a low pressure spool speed range alone. The method can include maintaining an accessory speed range using a transmission connected to the combination output by selectively switching between a first state having a first gear ratio and a second state having a second gear ratio. The method can include any other suitable method(s) and/or portion(s) thereof.

Figure 5:
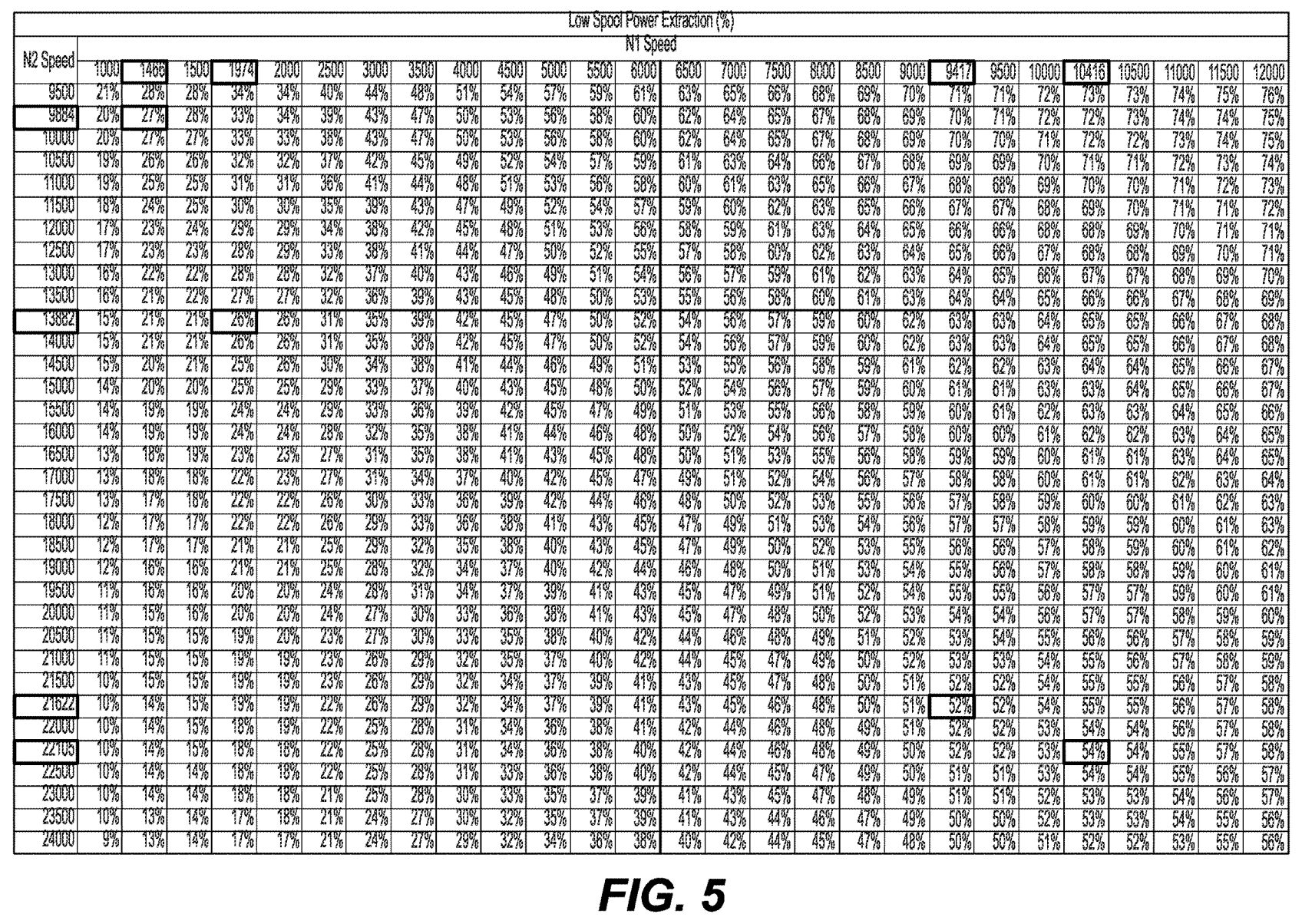

As appreciated by those having ordinary skill in the art in accordance with this disclosure, in at least some embodiments of the differential 100, e.g., as shown, regardless of relative speed change between the high pressure spool and the low pressure spool, a smaller speed range than the low pressure spool speed range is always output. However, power extraction from each spool changes based on the absolute speed of the high pressure spool versus the low pressure spool as shown in the chart of FIG. 5.

The size of one or more of the gears of the gear assembly 101 can be changed to achieve a desired speed range and desired power extraction. Referring to FIG. 5, the typical speeds of the low pressure spool input speed (shown as N1 speed) and the high pressure spool input speed (shown as N2 speed) may be a diagonal line from the top left to the bottom right of the chart. However, any suitable speed possibilities for any suitable engine design are contemplated herein.

Power extraction can be shared between the high pressure spool and the low pressure spool. As shown in the chart of FIG. 5, low pressure spool power extraction can be about 30% during taxi and/or descent speed settings, and about 55% during takeoff and/or climb and/or cruise speed settings. Embodiments can reduce the output speed range and increase the minimum output speed (e.g., from about 1466 rpm to about 3871 rpm in certain embodiments) to accessories by combining high pressure spool and low pressure spool input speeds to a single output speed. Certain embodiments can provide about 50% output speed range reduction (e.g., 7.1:1 low pressure spool speed range and 2.2:1 high pressure spool speed range converted to a 3.5:1 output speed range) and about a 38% torque reduction at minimum speed.

In certain embodiments, the speed range may still require reduction for certain accessories (e.g., less than 2:1). For example, if the low pressure spool speed range is still greater than a threshold, e.g., 5:1, then a transmission assembly (e.g., 601) may be used to achieve an even smaller speed range. Embodiments of a differential allow use of a simple transmission to further reduce the speed range (e.g., to about 2:1 or less).

As shown, in certain embodiments, the transmission carrier 613 is rotated by the carrier 115 of the differential 101. The transmission carrier 615 can be clutched to the transmission ring gear 607 and the sun gear 609 can be selectively grounded. Opening the clutch and grounding the sun gear 609 can provide a gear ratio (e.g., dependent on gear sizing/teeth of transmission gears) between differential 101 and transmission output 605, and closing the clutch without grounding the sun gear 609 can make the differential 101 provide power straight through to the transmission output 605 (e.g., a second gear ratio of 1:1 or any other suitable value).

Accordingly, embodiments can take a speed range from one or more embodiments of a dual spool differential and convert it to a speed range that is usable by certain aircraft engine accessories (e.g., a range of 2.2:1 or less, for example). For example, for an output range of 3.6:1 from the differential 101 (e.g., output speed range of about 3871 rpm to about 13756 rpm) and a 1.16:1 differential output gear ratio, and for a first transmission assembly gear ratio R1 of 1.6 (open clutch) and a second transmission assembly gear ratio R1 of 1.0 (closed clutch), the transmission output speed range can be controlled to about 7200 rpm to about 16000 rpm (about 2.2:1). As appreciated by those having ordinary skill in the art in view of this disclosure, ratios can be adjusted to meet required output speeds.

Embodiments can include a dual spool differential used as an input to a small, lightweight and simple transmission to drive aircraft engine accessories, for example. The transmission input can be on the transmission carrier from the differential carrier. A grounded sun gear can provide a speed-trimming function to adjust the speed of the planet gears that are mounted in the carrier. The planet gears can mesh with the sun gear and ring gear which causes a rotation of the ring gear. The output of the transmission can be connected to the ring gear which drives the accessories, for example. A clutch between the carrier and ring gear can allow for straight-through operation. Embodiments allow for the output speed to be easily set by adjusting the gear ratios of the transmission, for example.

Certain embodiments include an epicyclic differential with high pressure spool and low pressure spool inputs that produces a smaller output speed range than the low pressure spool alone. The output of the differential can drive one or more aircraft and/or engine accessories (e.g., a generator). The output speed range ratio can be controlled by adjusting the differential parameters, for example.

Extracting power from the low pressure spool can allow for the high pressure spool to be made more efficient while also allowing for a lower idle speed which decreases brake wear. Embodiments can increase the minimum output speed which reduces the low speed torque. The reduced output speed range can simplify the size and configuration of a downstream transmission (e.g., a variable speed transmission) associated with the engine, for example. In certain embodiments, the downstream transmission can be eliminated entirely if the speed range is small enough, e.g., about 5:1.

Low spool power extraction can improve engine efficiency and stability, and can reduce brake wear during taxi. Embodiments can reduce maximum torque through the transmission as well.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A turbomachine dual spool transmission system, comprising:
    a transmission assembly configured to connect to a combination output of a dual spool differential at a transmission input to be driven by the combination output to turn a transmission output, wherein the transmission assembly is configured to provide a first output gear ratio in a first state and a second output gear ratio in a second state,
    wherein the transmission assembly includes a transmission ring gear, a transmission sun gear, and a plurality of transmission planetary gears disposed between the transmission sun gear and the transmission ring gear and meshed with the transmission sun gear and the transmission ring gear, wherein the transmission planetary gears are rotationally connected to a transmission carrier, wherein the transmission input is the transmission carrier or is connected to the transmission carrier.

2. The system of claim 1, further comprising the dual spool differential, wherein the dual spool differential includes a gear assembly configured to combine a low pressure spool input and a high pressure spool input into a combination output to provide an output speed range smaller than a low pressure speed range alone.

3. The system of claim 1, wherein the transmission output is the transmission ring gear or is connected to the transmission ring gear.

4. The system of claim 3, wherein the transmission sun gear is configured to be grounded such that the transmission sun gear does not rotate.

5. The system of claim 4, further comprising a rotating clutch configured to selectively engage the transmission carrier and the transmission ring gear.

6. The system of claim 5, wherein, in the first state, the rotating clutch is disengaged and the sun gear is grounded such that the transmission carrier can rotate relative to the transmission ring gear, and such that the transmission ring gear is rotated by the planetary gears in accordance with the first gear ratio.

7. The system of claim 6, wherein, in the second state, the rotating clutch is engaged and the sun gear is not grounded such that the transmission carrier is fixed to the transmission ring gear and directly rotates the transmission ring gear in accordance with the second gear ratio.

8. The system of claim 7, wherein the transmission carrier includes a transmission input gear meshed with an output gear of the combination output.

9. A turbomachine, comprising:
    a high pressure spool;
    a low (or intermediate) pressure spool; and
    a dual spool differential comprising a gear assembly connected to the low pressure spool at a low pressure spool input and the high pressure spool at a high pressure spool input, the gear assembly configured to combine the low pressure spool input and the high pressure spool input into a combination output to provide an output speed range smaller than a low pressure speed range alone; and
    a transmission assembly connected to the combination output at a transmission input to be driven by the combination output to turn a transmission output, the transmission configured to provide a first output gear ratio in a first state and a second output gear ratio in a second state.

10. The turbomachine of claim 9, wherein the transmission assembly includes a transmission ring gear, a transmission sun gear, and a plurality of transmission planetary gears disposed between the transmission sun gear and the transmission ring gear and meshed with the transmission sun gear and the transmission ring gear, wherein the transmission planetary gears are rotationally connected to a transmission carrier.

11. The turbomachine of claim 10, wherein the transmission input is the transmission carrier or is connected to the transmission carrier.

12. The turbomachine of claim 11, wherein the transmission output is the transmission ring gear or is connected to the transmission ring gear.

13. The turbomachine of claim 12, wherein the transmission sun gear is configured to be grounded such that the transmission sun gear does not rotate.

14. The turbomachine of claim 13, further comprising a rotating clutch configured to selectively engage the transmission carrier and the transmission ring gear.

15. The turbomachine of claim 14, wherein, in the first state, the rotating clutch is disengaged and the sun gear is grounded such that the transmission carrier can rotate relative to the transmission ring gear, and such that the transmission ring gear is rotated by the planetary gears in accordance with the first gear ratio.

16. The turbomachine of claim 15, wherein, in the second state, the rotating clutch is engaged and the sun gear is not grounded such that the transmission carrier is fixed to the transmission ring gear and directly rotates the transmission ring gear in accordance with the second gear ratio.

17. The turbomachine of claim 16, wherein the transmission carrier includes a transmission input gear meshed with an output gear of the combination output.

18. A method, comprising:
   combining a low pressure spool input of a turbomachine and a high pressure spool turbomachine into a combination output to produce a reduced speed range relative to a low pressure spool speed range alone; and
   maintaining an accessory speed range using a transmission connected to the combination output by selectively switching between a first state having a first gear ratio and a second state having a second gear ratio.

* * * * *